May 24, 1960  A. SAUER  2,937,968
MANUFACTURE OF LAMINATED SHEET MATERIALS
Filed Oct. 21, 1955
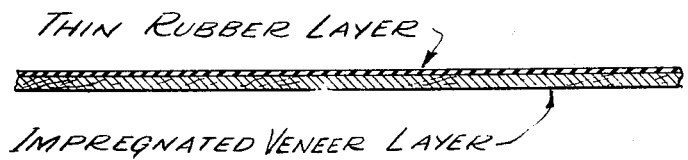
INVENTOR.
ALEXANDER SAUER United States Patent Office
2,937,968
Patented May 24, 1960

2,937,968

MANUFACTURE OF LAMINATED SHEET MATERIALS

Alexander Sauer, Zurich, Switzerland, assignor to Romika K.G. Lemm & Co., Gusterarth-Tal, Germany Filed Oct. 21, 1955, Ser. No. 542,096

Claims priority, application Switzerland Oct. 28, 1954

3 Claims. (Cl. 154—100)

This invention relates to a process for the manufacture of a laminated sheet material having an outer facing layer united to a sheet layer which contains natural or artificial rubber, whereby the rubber-containing sheet layer imparts flexibility to the laminated material or, when used as an intermediate bonding layer between the facing and a rigid support, offers a certain resilience with a cushioning effect on the facing.

Accordingly, the invention provides a process for the manufacture of a flexible laminated sheet material, wherein a facing of one or more layers of flexible fibrous material impregnated with a thermosetting resinous condensation product is united to a preformed sheet of a vulcanisable natural or artificial rubber composition, which contains at least 5 percent of a thermosetting resinous condensation product on the weight of the rubber, by hot pressing under conditions such that the rubber undergoes vulcanisation and the condensation product is hardened.

The vulcanisable sheet may be prepared by mixing a thermosetting resinous condensation product with the ingredients of a vulcanisable natural or artificial rubber composition, which may contain, in addition to the rubber and a vulcanising agent, the usual ingredients of such compositions, such as a vulcanisation accelerator, an activator and a filler. The temperature during the mixing is preferably sufficient to melt the condensation product, and the mixing operation may be carried out on mixing rollers such as are used for preparing rubber mixes. If the mixing is carried out at a temperature likely to cause vulcanisation of the rubber, it is preferable to add the accelerator towards the end of the mixing operation. When an intimate and uniform mixture has been obtained, the mixture is rolled into sheet form. It is desirable that during the mixing and/or rolling operation the condensation product should undergo partial polymerisation to an extent such that the vulcanisable sheet will not become liquid during the hot pressing operation. However, the condensation product is not finally hardened at this stage, since the final hardening must be carried out during the hot pressing of the vulcanisable sheet and the facing.

While the vulcanisable rubber composition must contain at least 5 percent of the resinous condensation product on the weight of the rubber, the relative proportions of the condensation product and the rubber may vary within wide limits depending on the degree of flexibility or resilience desired in the rubber-containing sheet after vulcanisation. For example, the proportion of the condensation product may be within the range of 10 to 300 percent on the weight of the rubber.

For the facing there may be used any desired flexible fibrous materials, such as wood veneer, paper, cardboard or a textile fabric, for example, of rayon, cotton, linen, hemp or jute. The fibrous material is impregnated with a thermosetting resinous condensation product, and, if desired, a plurality of layers of the impregnated material may be used to form the facing.

A sheet of wood veneer impregnated with the condensation product may be united by hot pressing with a vulcanisable sheet containing rubber and a resinous condensation product to produce a flexible laminated material having a glossy facing exhibiting the grain of the wood. The rubber-containing sheet thus united as a backing to the wood veneer improves the flexibility and resistance to breaking of the veneer especially in a direction transversely of the grain. Such a flexible wood veneer is very suitable, for example, for covering the walls of rooms and other surfaces, such as furniture, for example, the tops of tables.

For the facing there may also be used a sheet of paper, cardboard or textile fabric bearing a design, picture or inscription, for example, a printed design, a printed or written inscription, a painted picture or photograph. The sheet is impregnated with a resinous condensation product and united with the design, picture or inscription outermost to the rubber-containing sheet to produce a flexible laminated sheet having the design or the like protected by a glossy transparent film of the hardened resin.

If desired, the facing may be formed by interposing between a flexible fibrous material impregnated with the condensation product and the vulcanisable sheet a non-impregnated flexible fibrous material through which condensation product from the impregnated material penetrates during the hot pressing operation. Thus, for example, the non-impregnated material may be a sheet bearing a design, picture or inscription as described above, and the impregnated material may be of thin paper or gauze fabric which is rendered substantially transparent by the condensation product during the hot pressing operation so as to render the design or the like visible through the resin-treated paper or fabric.

Any desired thermosetting resinous condensation products may be used, for example, a melamine-formaldehyde, phenol-formaldehyde, cresol-formaldehyde or urea-formaldehyde condensation product.

It may also be of advantage to unite as a reinforcement a layer of a non-impregnated textile fabric during the hot pressing operation to the rear surface of the vulcanisable sheet.

The invention also provides a process for the manufacture of a non-flexible laminated sheet material, wherefacture of a non-flexible laminated sheet material, wherein a facing and a rubber-containing vulcanisable sheet of the kind described above are simultaneously united to each other and to a rigid support placed in contact with the vulcanisable sheet by hot pressing under conditions such that the rubber undergoes vulcanisation and the condensation product is hardened. The rigid support may be, for example, a sheet of wood, compressed cork, or compressed wood meal or wood chips.

The product resulting from the process of this invention is illustrated in the accompanying drawing wherein the figure is a cross sectional view of the flexible laminated sheets.

The following example illustrates the production of a flexible laminated sheet in accordance with the invention:

Crude rubber is worked on a roller mill. It is then mixed with the resinous condensation product by means of rollers heated at 40–50° C. Sulphur and filler are then added, but not the accelerator. The mixture is then worked on a roller mill heated at about 120° C. so as to cause polymerisation of the condensation product and with the rollers urged very close together, so that the mixture is withdrawn as a paper-thin sheet, the sheet being removed from the roller by means of a doctor blade. This treatment is carried on for about 3–4 minutes until the condensation product has been semi-polymerised. This can be recognised by the fact that the material acquires a gloss and loses its rubbery character and resembles an artificial plastic. The accelerator is incorporated in the mixture as near to the end of the treatment as possible, so that the rubber does not undergo vulcanisation at the temperature of 120° C. at which it is being worked. The material is then cooled, and worked up on an ordinary calendar heated at about 40–50° C. into a sheet of the desired thickness.

A sheet of paper or wood veneer is impregnated by immersion in a solution of a resinous condensation product, and then dried. The impregnated sheet is then placed in contact with the preheated rubber-resin sheet, and the assembly is inserted in a press and compressed at 130° C. under a pressure of 70 kilograms per square centimetre for 3–5 minutes, whereby the rubber is vulcanised and the resinous condensation product is hardened.

Examples of compositions suitable for making the rubber-resin sheet in the manner described above are as follows:

|  |  | A | B |
|---|---|---|---|
| Resinous condensation product | kilograms | 1.0 | 2.5 |
| Natural or artificial rubber | do | 2.5 | 1.0 |
| Filler (kaolin, wood meal, etc.) | do | 6.3 | 6.3 |
| Zinc oxide | grams | 200 |  |
| Sulphur | do | 50 | 50 |
| Accelerator | do | 100 | 100 |

What I claim is:

1. A process of manufacturing flexible laminated sheet material including a flexible backing layer and a flexible ornamental facing layer; comprising the steps of preparing a vulcanizable sheet by adding to a mass of vulcanizable rubber composition a thermosetting resinous condensation product with the quantity of thermosetting resinous condensation product being at least 5% by weight of the mass of rubber composition, mixing the mass in a zone of heat at a temperature sufficient to melt said thermosetting resinous condensation product, rolling the heated mass to form a thin sheet while partially polymerizing said thermosetting resinous condensation product to prevent said mass from liquefying during subsequent heating, impregnating a sheet of wood veneer with a mass of said thermosetting resinous condensation product, pressing said thin sheet on said impregnated sheet of wood veneer under heat to vulcanize said rubber composition in said thin sheet and to simultaneously cause full polymerization of said resinous condensation product in said thin sheet and on said impregnated sheet of wood veneer while intimately bonding said sheet of wood veneer and said thin sheet.

2. A process of manufacturing flexible laminated sheet material including a flexible backing layer and a flexible ornamental facing layer; comprising the steps of preparing a rubber sheet by mixing about 2.5 kilograms of rubber, about 6.3 kilograms of a filler selected from the group consisting of kaolin and wood meal, about 200 grams of zinc oxide, about 50 grams of sulfur, to form a mass of vulcanizable rubber composition, adding to said mass of rubber composition a thermosetting resinous condensation product with the quantity of thermosetting resinous condensation product being at least 5% by weight of the mass of rubber composition, mixing the mass in a zone of heat at a temperature sufficient to melt said thermosetting resinous condensation product, rolling the heated mass to form a thin sheet while partially polymerizing said thermosetting resinous condensation product to prevent said mass from liquefying during subsequent heating, impregnating a sheet of wood veneer with a mass of said thermosetting resinous condensation product, pressing said thin sheet on said impregnated sheet of wood veneer under heat to vulcanize said rubber composition in said thin sheet and to simultaneously cause full polymerization of said resinous condensation product in said thin sheet and on said impregnated sheet of wood veneer while intimately bonding said thin sheet and said sheet of wood veneer together.

3. A process of manufacturing flexible laminated sheet material including a flexible backing layer and a flexible ornamental facing layer; comprising the steps of preparing a rubber sheet by mixing about 2.5 kilograms of rubber, about 6.3 kilograms of a filler selected from the group, consisting of kaolin and wood meal, about 200 grams of zinc oxide and about 50 grams of sulfur, to form a mass of vulcanizable rubber composition, adding to said mass of rubber composition a thermosetting resinous condensation product with the quantity of thermosetting resinous condensation product being at least 5% by weight of the mass of rubber composition, mixing the mass in a zone of heat at a temperature sufficient to melt said thermosetting resinous condensation product, rolling the heated mass to form a thin sheet while partially polymerizing said thermosetting resinous condensation product to prevent said mass from liquefying during subsequent heating while adding about 100 grams of an accelerator during the last stages of said rolling without completely vulcanizing said mass, impregnating a sheet of wood veneer with a mass of said thermosetting resinous condensation product, pressing said thin sheet on said impregnated sheet of wood veneer under heat to vulcanize said rubber composition in said thin sheet and to simultaneously cause full polymerization of said resinous condensation product in said thin sheet and on said impregnated sheet of wood veneer while intimately bonding said thin sheet and said sheet of wood veneer together.

References Cited in the file of this patent

UNITED STATES PATENTS

| 348,593 | Spurr | Sept. 7, 1886 |
| 1,352,739 | Egerton | Sept. 14, 1920 |
| 1,402,288 | Fisher | Jan. 3, 1922 |
| 1,597,539 | Novotny et al. | Aug. 24, 1926 |
| 1,749,824 | Lord | Mar. 11, 1930 |
| 1,946,932 | Courtney | Feb. 13, 1934 |
| 2,123,155 | Groff | July 5, 1938 |
| 2,128,229 | Charch et al. | Aug. 30, 1938 |
| 2,234,621 | Brous | Mar. 11, 1941 |
| 2,276,567 | Donaldson | Mar. 17, 1942 |
| 2,429,397 | Compton et al. | Oct. 21, 947 |
| 2,459,739 | Groten et al. | Jan. 18, 1949 |
| 2,659,706 | Fisk et al. | Nov. 17, 1953 |
| 2,669,535 | Orr | Feb. 16, 1954 |
| 2,680,700 | Meyers | June 8, 1954 |
| 2,720,479 | Crawford et al. | Oct. 11, 1955 |
| 2,724,675 | Williams | Nov. 22, 1955 |
| 2,758,953 | Cottle et al. | Aug. 14, 1956 |

FOREIGN PATENTS

| 225,251 | Great Britain | Nov. 24, 1924 |
| 549,615 | Great Britain | Nov. 30, 1942 |